United States Patent
Ootsuka

(10) Patent No.: US 7,489,364 B2
(45) Date of Patent: Feb. 10, 2009

(54) Y/C SEPARATION CIRCUIT AND Y/C SEPARATION METHOD

(75) Inventor: Isao Ootsuka, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 653 days.

(21) Appl. No.: 11/251,884

(22) Filed: Oct. 18, 2005

(65) Prior Publication Data

US 2006/0082688 A1    Apr. 20, 2006

(30) Foreign Application Priority Data

Oct. 19, 2004    (JP)    ............... 2004-303690

(51) Int. Cl.
*H04N 9/78* (2006.01)
(52) U.S. Cl. .................. 348/663; 348/664; 348/665
(58) Field of Classification Search ......... 348/663–666, 348/712, 713; *H04N 9/77, 9/78*
See application file for complete search history.

(56) References Cited

U.S. PATENT DOCUMENTS 6,999,130 B2 *    2/2006    Tanigawa ............... 348/663
7,110,045 B2 *    9/2006    Ishihara ............... 348/663

FOREIGN PATENT DOCUMENTS

| JP | 60-47793 | 10/1985 |
| JP | 10-224816 | 8/1998 |
| JP | 2000-175219 | 6/2000 |

* cited by examiner

*Primary Examiner*—Sherrie Hsia
(74) *Attorney, Agent, or Firm*—McGinn IP Law Group, PLLC

(57) ABSTRACT

A Y/C separation circuit according to the present invention includes: a pattern determination section in which video signals "a", "b", and "c" of three lines from which a frequency band of a chrominance subcarrier is extracted through BPFs to determine whether an addition/subtraction result of (b−a), (b+a), (b−c), (b+c), (c−a), and (c+a) is positive or negative, thereby determining relations in amplitude and phase between the video signals "a", "b", and "c"; and a filtering section in which one of plural filtering operations for separating a chrominance signal is selected in accordance with the determination result sent from the pattern determination section to output a chrominance signal through the selected filtering operation.

15 Claims, 14 Drawing Sheets

$c < a < |b|$ $c < b < a$ b < a < |c|

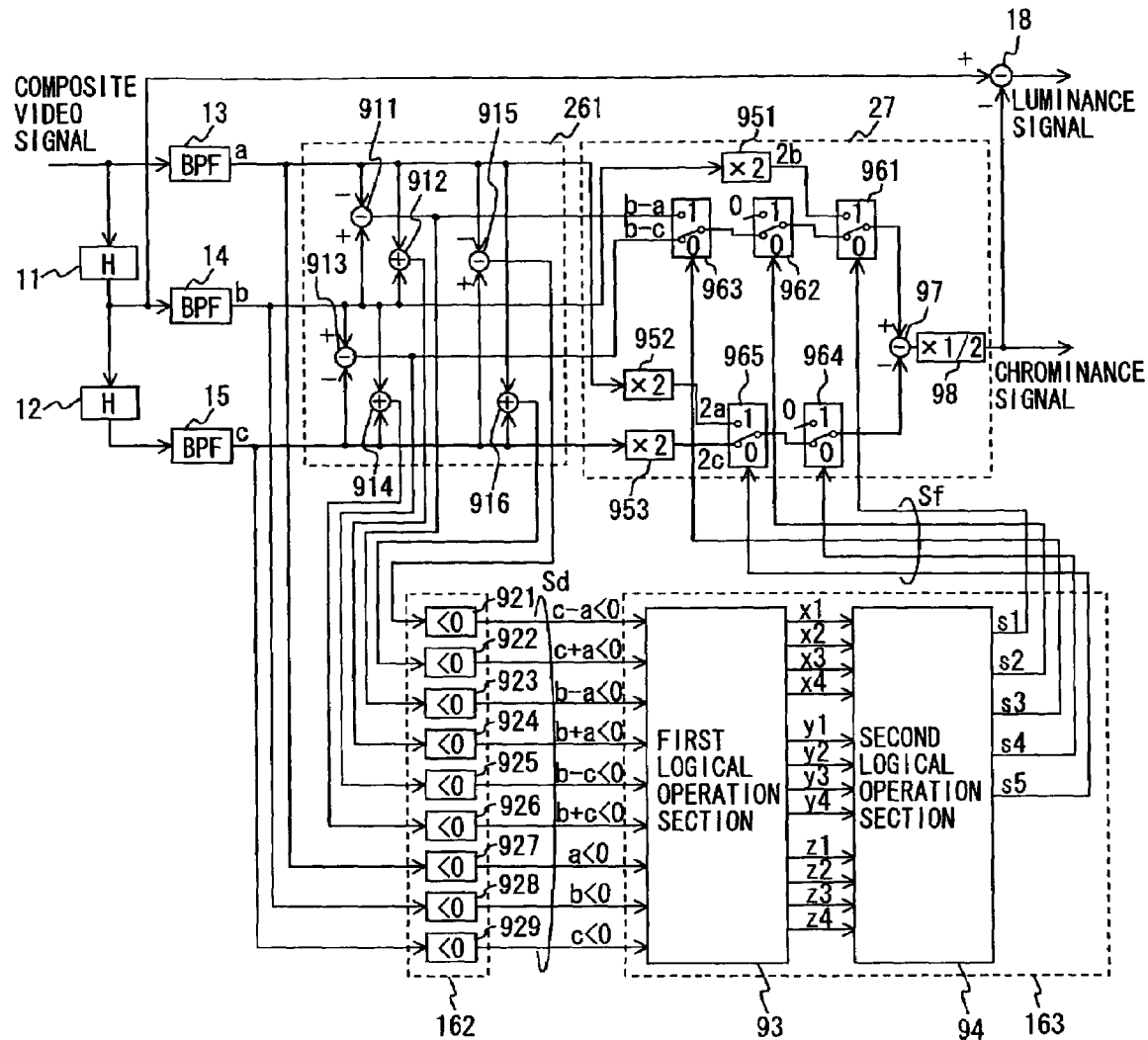

$x1=(b<0)\char`\^(b-c<0)$
$x2=((b<0)\sim\sim(c<0))\&\sim((b<0)\char`\^(b-c<0))$
$x3=((b<0)\char`\^(c<0))\&\sim((b<0)\char`\^(b+c<0))$
$x4=(b<0)\char`\^(b+c<0)$
$y1=(b<0)\char`\^(b-a<0)$
$y2=((b<0)\sim\sim(a<0))\&\sim((b<0)\char`\^(b-a<0))$
$y3=((b<0)\char`\^(a<0))\&\sim((b<0)\char`\^(b+a<0))$
$y4=(b<0)\char`\^(b+a<0)$
$z1=(b<0)\char`\^(c-a<0)$
$z2=(b<0)\sim\sim(c-a<0)$
$z3=(b<0)\sim\sim(c+a<0)$
$z4=(b<0)\char`\^(c+a<0)$ $s1=x4\char`\^y4$
$s2=x1\char`\^y1$
$s3=(z1\char`\^z3)\sim\sim(y1+y4)$
$s4=(x4\char`\^y4)+z4+((x1+x2)\&(y1+y2))$
$s5=z2$

Fig. 10

Y/C SEPARATION CIRCUIT AND Y/C SEPARATION METHOD

BACKGROUND OF THE INVENTION

1. Field of the Invention

The present invention relates to a Y/C separation circuit for separating a composite video signal into a luminance signal and a chrominance signal.

2. Description of Related Art

Y/C separation circuits are used for separating a composite video signal such as an NTSC signal or a PAL signal into a chrominance signal (C signal) and a luminance signal (Y signal). A Y/C separation method includes a frequency separation method, a two-dimensional Y/C separation method, and the like. Among those, the frequency separation method extracts from the composite video signal, a frequency band of a chrominance subcarrier obtained by modulating the chrominance signal, through a band-pass filter. The frequency separation method only requires the band-pass filter for separation, so the separation can be easily performed. As for a high-contrast image etc., a high-frequency component of the luminance signal passes through the band-pass filter, which would cause a contrast degradation and a cross-color artifact.

The two-dimensional Y/C separation method separates a chrominance signal from a luminance signal through a comb filter based on the relation that luminance signals of adjacent horizontal scan lines are in same phase, and chrominance subcarriers of adjacent lines are in opposite phase, insofar as a horizontal correlation is maintained. To be specific, when signals of adjacent lines correlate with each other, the signals of adjacent lines are subtracted from each other, so the luminance signals are cancelled out to extract the chrominance signal alone. Further, the extracted chrominance signal is subtracted from the original composite video signal to obtain the luminance signal.

As regards the NTSC signal, a chrominance subcarrier inverts its phase in one horizontal scanning period. As regards a PAL signal, a chrominance subcarrier inverts its phase in two horizontal scanning periods. Thus, adjacent lines in this specification imply lines ahead of and behind one horizontal scanning period for the NTSC signal, and imply lines ahead of and behind two horizontal scanning periods for the PAL signal.

In the two-dimensional Y/C separation method, the Y/C separation is carried out by use of a correlation (vertical correlation) between the signals of adjacent lines, so a luminance signal may be well separated from a chrominance signal if there is little change in luminance (luminance transition) and in color (color transition) between lines, and a vertical correlation is strong. However, as for an image having a diagonal stripe pattern in which a luminance between lines abruptly changes or an image involving a sharp color change between lines in a horizontal direction, a vertical correlation between lines is not so strong, so a chrominance signal cannot be well separated from a luminance signal with the two-dimensional Y/C separation method. As regards such an input signal, a chrominance signal may be well separated with the frequency separation method rather than with the two-dimensional Y/C separation method.

In this way, the optimum Y/C separation method varies depending on the correlation between lines of the video signal. Hence, there has been proposed hitherto a Y/C separation circuit (hereinafter referred to as adaptive Y/C separation circuit) in which a frequency separation method and a two-dimensional separation method can be selected according to an input signal (see Japanese Examined Patent Publication No. 60-47793, Japanese Unexamined Patent Publication No. 10-224816, and Japanese Unexamined Patent Publication No. 2000-175219, for example). Such adaptive Y/C separation circuits detect a correlation between adjacent two lines or adjacent two of three lines to select a filtering operation applied to the chrominance signal separation based on the detection result.

For example, the adaptive Y/C separation circuit disclosed in Japanese Examined Patent Publication No. 60-47793 determines the presence/absence of the horizontal correlation by calculating a difference in signal amplitude between signals in three lines, and judging whether the amplitude difference is a predetermined threshold or less. Besides, if the amplitude difference exceeds the threshold, the correlation (horizontal correlation) between signals of the same line is detected to determine whether the vertical correlation is severed due to a luminance transition or a color transition. Based upon the determination result of the vertical correlation and horizontal correlation, a filtering operation for separating a chrominance signal is selected.

As mentioned above, the conventional adaptive Y/C separation circuit not only compares signals of three lines in terms of amplitude and phase, upon the determination for selecting a filtering operation for separating a chrominance signal, but also detects a correlation based on a signal amplitude difference between signals of three lines, and detects a correlation based on the vertical correlation and horizontal correlation. Thus, the conventional adaptive Y/C separation circuit has a problem that operations for detecting a correlation are complicated.

SUMMARY OF THE INVENTION

According to one aspect of the present invention, there is provided a Y/C separation circuit which includes a band selecting section outputting a first video signal, a second video signal, and a third video signal by means of extracting signals which include a chrominance subcarrier from three composite video signals that are delayed from one another by one or two horizontal scanning periods; and a filtering section executing an operation for separating a chrominance signal based on the determination result of the pattern determination section to output the chrominance signal. wherein the pattern determination section determines the relations in amplitude and phase between the first video signal, the second video signal, and the third video signal by positive/negative determination which determines whether the first video signal, the second video signal, the third video signal, an addition signal obtained by adding two of the video signals, and a subtraction signal obtained by subtracting two of the video signals take positive values or negative values.

In the Y/C separation circuit, the pattern determination section detecting a signal correlation necessary for selecting a filtering operation by use of a result of classifying input signals based on a positive/negative determination about signals of three lines. In this way, the Y/C separation circuit according to the present invention determines a vertical correlation through simple operations for determining the relations in amplitude and phase of signals of three adjacent lines to thereby select a filtering operation.

According to another aspect of the present invention, there is provided a Y/C separation method. The method includes (1) outputting a first video signal, a second video signal, and a third video signal by means of extracting signals which include a chrominance subcarrier from three composite video signals that are delayed from one another by one or two horizontal scanning periods; (2) executing positive/negative determination which determines whether the first video signal, the second video signal, the third video signal, an addition signal obtained by adding two of the video signals, and a subtraction signal obtained by subtracting two of the video signals from each other take positive values or negative values to determine relations in amplitude and phase between the first video signal, the second video signal, and the third video signal; (3) selecting one of a plurality of filtering operations for separating a chrominance signal based on a result of the determination about relations in amplitude and phase between the first video signal, the second video signal, and the third video signal to output the chrominance signal through the selected filtering; and (4) subtracting the output chrominance signal from a signal obtained by delaying the input composite video signal by one or two horizontal scanning periods to output a luminance signal.

In the Y/C separation method, it is determined whether the signals of three lines, the addition signal, and the subtraction signal take positive values or negative values to classify input signals based on only the relations in amplitude and phase between the signals of three lines to select a filtering operation for separating a chrominance signal. In this way, the Y/C separation method according to the present invention determines a vertical correlation through simple operations for determining the relations in amplitude and phase of signals of three adjacent lines to thereby select a filtering operation.

According to still another aspect of the present invention, there is provided a Y/C separation method. The method includes (1) outputting a video signal "a", a video signal "b", and a video signal "c" by means of extracting signals which include a chrominance subcarrier from three composite video signals that are delayed from one another by one or two horizontal scanning periods; (2) classifying relations in amplitude and phase between the signals "c" and "b" into one of areas divided by c=b, c=−b, and c=0, classifying relations in amplitude and phase between the signals "a" and "b" into one of areas divided by a=b, a=−b, and a=0, and classifying a relation in amplitude between |a| and |c| and a relation in phase between the signals "a" and "c" into one of areas divided by a=c, and a=−c to determine relations in amplitude and phase between the three video signals "a", "b", and "c"; (3) selecting one of a plurality of filtering operations for separating a chrominance signal based on a result of the determination about the relations in amplitude and phase between the three video signals "a", "b", and "c" to output the chrominance signal through the selected filtering operation; and (4) subtracting the output chrominance signal from a signal obtained by delaying the input composite video signal by one or two horizontal scanning periods to output a luminance signal.

According to the Y/C separation method according to the other aspect of the invention as well, it is possible to classify input signals based on relations in amplitude and phase between signals of three lines to thereby select a filtering operation for separating a chrominance signal.

According to the present invention, it is possible to provide a Y/C separation circuit and Y/C separation method in which the relations in amplitude and phase between signals of three lines are determined to select filtering for separating a chrominance signal based on the determination result.

BRIEF DESCRIPTION OF THE DRAWINGS

The above and other objects, advantages and features of the present invention will be more apparent from the following description taken in conjunction with the accompanying drawings, in which:

FIG. 10 is a diagram showing a Y/C separation circuit according to the present invention;

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

The configuration of the Y/C separation circuit related to the present invention is explained hereinafter. The Y/C separation circuit in accordance with one aspect of the present invention has a band selecting section. The band selecting section outputs three video signals "a", "b" and "c", by means of extracting signals which include a chrominance subcarrier from three composite video signals that are delayed from one another by one or two horizontal scanning periods. Further, the Y/C separation circuit has a pattern determination section. The pattern determination section determines the relations in amplitude and phase between the video signals "a", "b" and "c" by positive/negative determination. The positive/negative determination determines whether the three video signals "a", "b" and "c", an addition signal obtained by adding two of the video signals, and a subtraction signal obtained by subtracting two of the video signals take positive values or negative values. Further, the Y/C separation circuit has a filtering section. The filtering section executes a filtering operation for separating a chrominance signal based on the determination result of the pattern determination section.

The concrete configuration of the Y/C separation circuit related to the present invention is explained hereinafter.

First Embodiment

Figure 1:
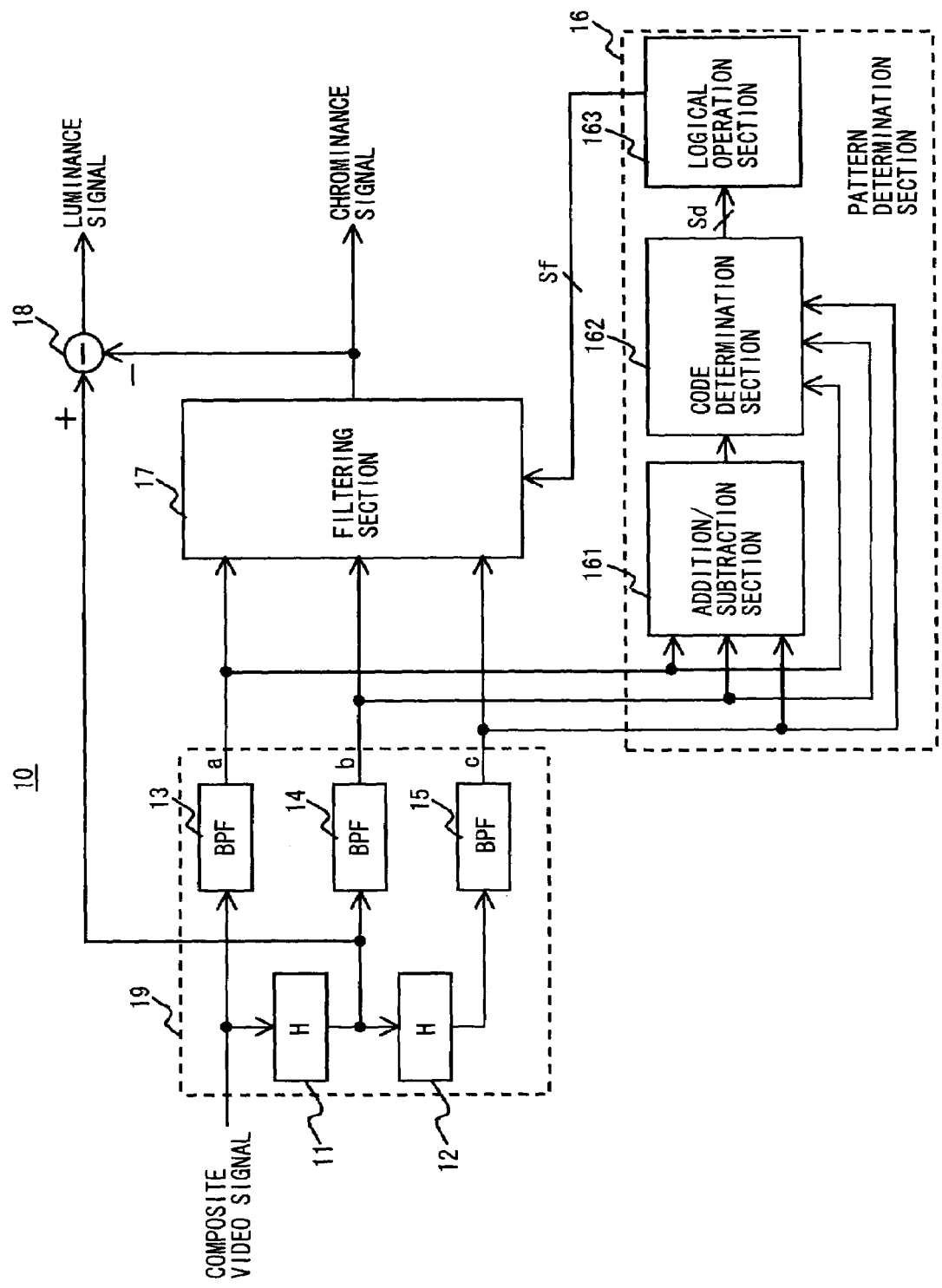
FIG. 1 is a diagram of a Y/C separation circuit according to the present invention.

FIG. 1 shows the configuration of a Y/C separation circuit 10 according to the present invention. Delay circuits 11 and 12 are line memories that give a delay of one horizontal scanning period to an input composite video signal. The composite video signal input to the Y/C separation circuit 10 is delayed for one horizontal scanning period by the delay circuit 11. In addition, an output signal from the delay circuit 11 is delayed for one horizontal scanning period by the delay circuit 12. Thus, the three signals, namely, the input composite video signal, the signal output from the delay circuit 11, and the signal output from the delay circuit 12 are signals of three adjacent lines. BPFs 13 to 15 are band-pass filters for extracting a signal which include a chrominance subcarrier from the composite video signal. The delay circuits 11 and 12, and the BPFs 13 to 15 correspond to band selecting section 19 for outputting three video signals that are delayed from one another by one horizontal scanning period.

In the following description, a signal "a" represents a signal obtained by applying the input composite video signal to the BPF 13 and subjecting the input signal to band-pass filtering, a signal "b" represents a signal obtained by applying the composite video signal output from the delay circuit 11 to the BPF 14 and subjecting the input signal to band-pass filtering, and a signal "c" obtained by inputting the composite video signal output from the delay circuit 12 to the BPF 15 and subjecting the signal to band-pass filtering.

A pattern determination section 16 determines relations in amplitude and phase between the signals "a", "b", and "c" output from the BPFs 13 to 15 to thereby determine whether the input signals have a vertical correlation. Following this, it is judged based on the determination result whether two-dimensional Y/C separation is effected through comb filtering. If not, it is judged whether an output from one of the BPFs 13 to 15 is used as a chrominance signal instead of the comb filtering, or no chrominance signal is output, that is, a chrominance signal amplitude is set to zero. Further, a filtering selection signal for selecting filtering for separating a chrominance signal is supplied to a filtering section 17.

A feature of the pattern determination section 16 is that the relations in signal amplitude and phase among the signal "a", "b", and "c" are determined based on whether the signals "a", "b", and "c", and addition and subtraction results thereof, more specifically, calculation results of (b−a), (b+a), (b−c), (b+c), (c−a), and (c+a) are positive or negative. An addition/subtraction section 161 in the pattern determination section 16 calculates values of (b−a), (b+a), (b−c), (b+c), (c−a), and (c+a), and outputs the calculation result to the code determination section 162. The code determination section 162 determines the signals output from the addition/subtraction section 161 and the signals "a", "b", and "c" output from the BPFs 13 to 15 are positive or negative to output a determination result signal Sd to the logical operation section 163. Here, the determination result signal Sd may be a 9-bit signal indicating a logical operation result that is true when a calculation result of the target signals (b−a, b+a, etc.) is negative, and is false when the calculation result is positive, for example, on a bit-to bit basis.

The logical operation section 163 determines a pattern indicated by an input signal using the determination result signal Sd output from the code determination section 162. Further, the logical operation section 163 outputs a filtering selection signal Sf for selecting a filtering operation for separating a chrominance signal to the filtering section 17.

Herein, the term "pattern" implies a change pattern of a amplitude relation and a phase relation of signals of three adjacent lines. Also, the determination of the pattern is based on a prescribed pattern classification rule for classifying change patterns of a amplitude relation and a phase relation of signals of three adjacent lines. The pattern classification rule and a pattern classification method based on the rule are detailed below.

The filtering section 17 is so configured as to select an optimum one of plural filtering operations for each of the signals "a", "b", and "c" output from the BPFs 13 to 15 and output a resultant signal as a chrominance signal. The filtering section 17 selects filtering according to the filtering selection signal Sf output from the pattern determination section 16 and outputs a signal subject to the selected filtering as a chrominance signal.

A subtracter 18 outputs a signal obtained by subtracting a chrominance signal output from the filtering section 17 from a signal output from the delay circuit 11 as a luminance signal.

Figure 2:
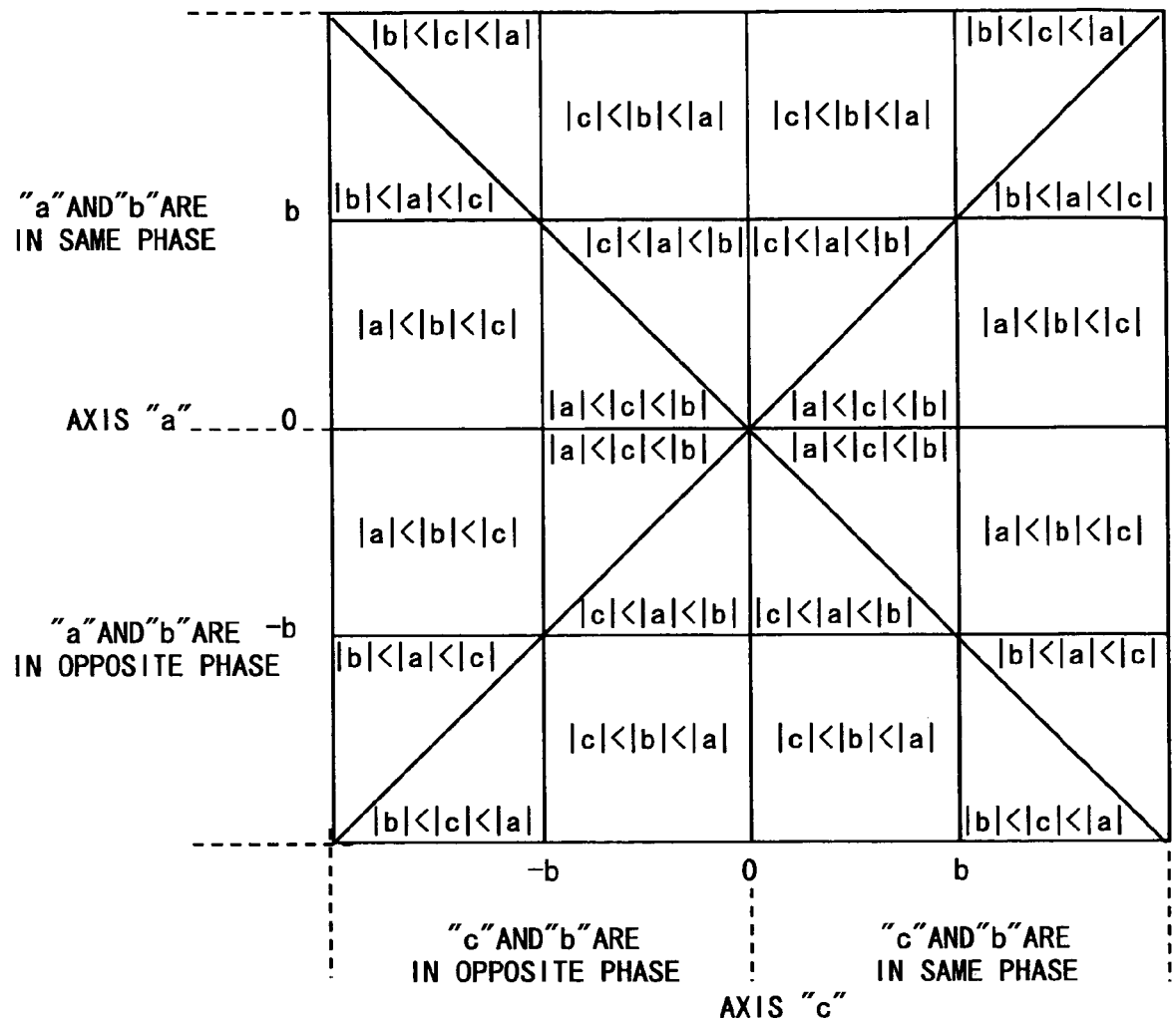
FIG. 2 shows a classification of signals of three adjacent signals according to the present invention.

Hereinbelow, description is given of the pattern classification rule for classifying patterns in the pattern determination section 16. FIG. 2 shows a classification that classifies input signals into 24 classes based on the relation in signal amplitude and phase between signals of three adjacent lines. More specifically, first, the input signals are classified into 6 classes based on the relation in signal amplitude (absolute value) between the signals "a", "b", and "c" of the three lines. The signals can be further classified into 4 classes based on the relation in phase between the signals "a", "b", and "c" (from the viewpoint of signal "b", (1) signals "a" and "c" are in same phase with the signal "b", (2) signals "a" and "c" are in opposite phase with the signal "b", (3) signal "a" is in same phase and signal "c" is in opposite phase with the signal "b", and (4) signal "a" is in opposite phase and signal "c" is in same phase with the signal "b"). Thus, the input signals are classified into 24 classes (6×4 classes) as a result of combining a classification based on the relation in signal amplitude and classification based on the relation in phase.

The classification of FIG. 2 is divided into four along the vertical axis (axis "a") thereof based on relations in signal amplitude (two) and phase (two) between the signal "a" and the signal "b". Meanwhile, the classification is divided into four along the horizontal axis (axis "c") thereof based on relations in signal amplitude and phase between the signal "c" and the signal "b". Hence, the signals of three adjacent lines can be classified into 16 based on amplitudes of the signals "a" and "c" relative to the signal "b" and phase relation. Further, diagonal lines drawn in the classification aim at classification based on the amplitudes of the signal "a" and the signal "c". Hence, the classification of FIG. 2 is divided into 24 areas.

Figure 3A:
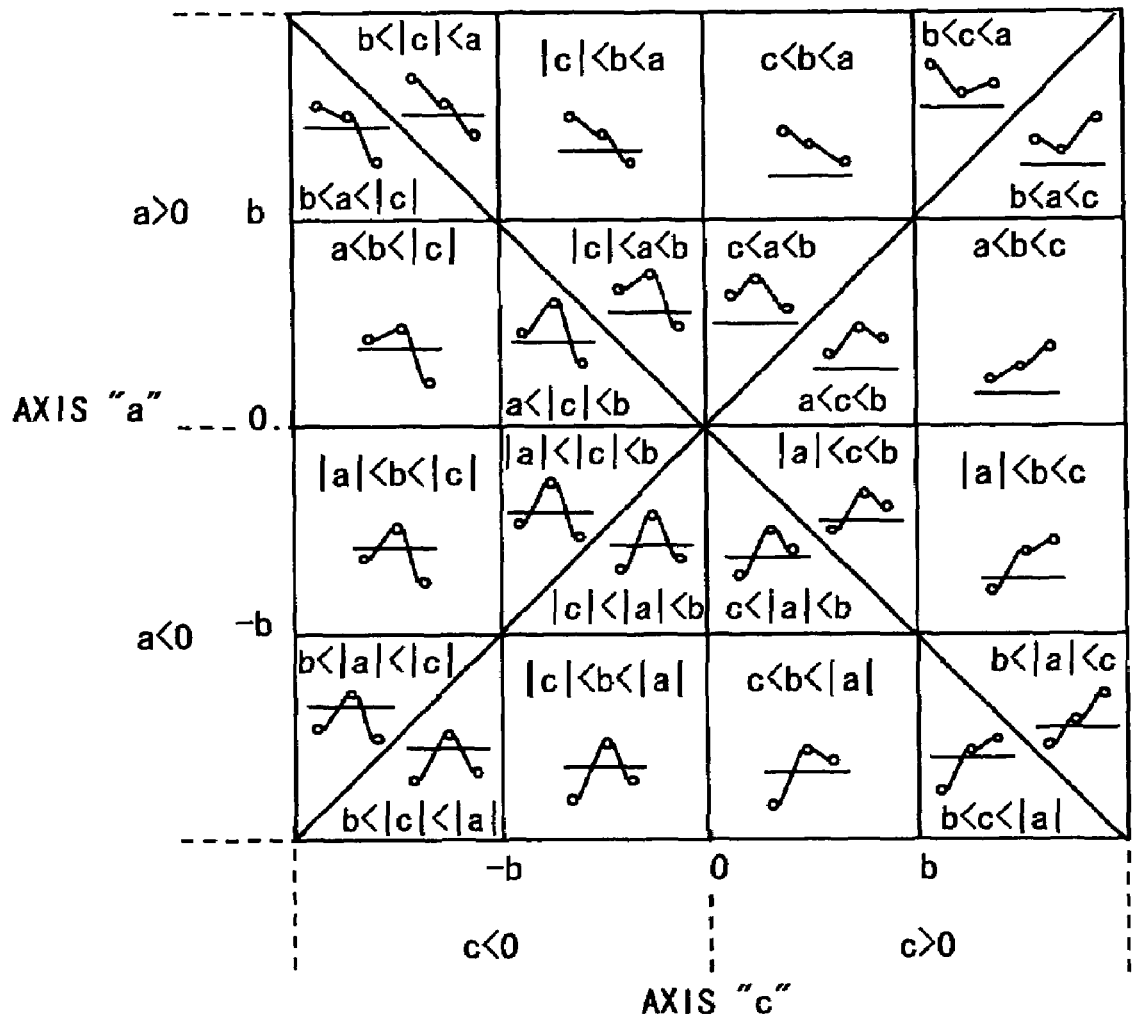
FIGS. 3A and 3B show a relation between a classification of signals of three lines and diagrams.
Figure 3B:
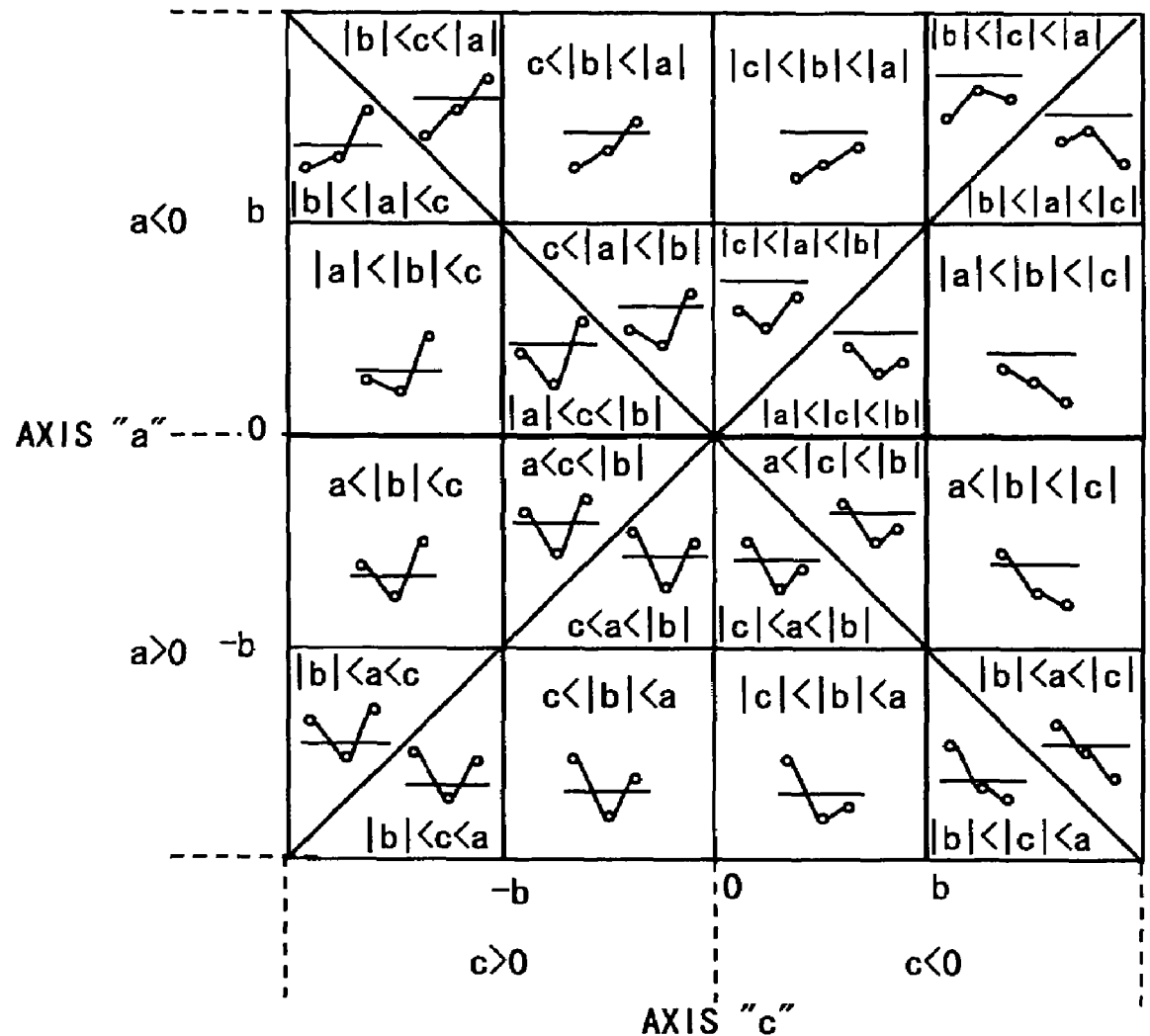
Figure 4A:
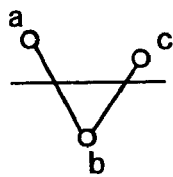
FIGS. 4A to 4D illustrate diagrams.
Figure 4B:
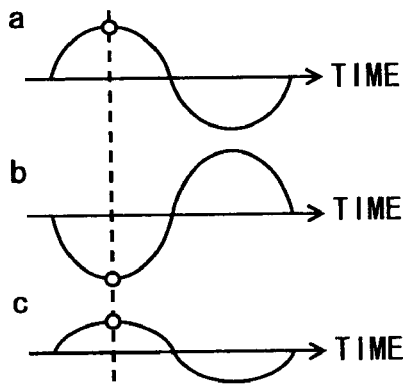

The classification of FIG. 2 is organized into a classification where a signal "b" takes a positive value as shown in FIG. 3A, and into a classification where the signal "b" takes a negative value as shown in FIG. 3B. FIG. 3A shows a classification where b>0, and FIG. 3B shows a classification where b<0. In this way, the classification of FIG. 2 or FIGS. 3A and 3B covers all the classes classified on the basis of the amplitude of signals of three lines and phase change. Note that the diagrams in the classification of FIGS. 3A and 3B illustrate the relations in signal amplitude and phase between the signals "a", "b", and "c" in a simple fashion. For example, the diagram of FIG. 4A represents that the relation in amplitude between the signals "a", "b", and "c" is c<a<|b|, that the signals "a" and "c" take a positive value and the signal "b" takes a negative value, and that the signals "a" and "c" are in opposite phase with the signal "b". FIG. 4B shows signals of three lines corresponding to the diagrams of FIG. 4A. The relation between the signals of three lines at time points indicated by the point of intersection with the broken line of FIG. 4B corresponds to the diagram of FIG. 4A. Note that as understood from the diagram of FIG. 4A, the signals "a" and "c" are both in opposite phase with the signal "b" as the relation between signals of three lines, which suggests a high possibility that a chrominance signal is input. The diagram shows that value of |a| is closer to a value of |b| than a value of |c|, so the signals "a" and "b" have a stronger vertical correlation than a vertical correlation between the signals "b" and "c".

Figure 4C:
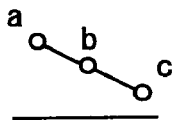
Figure 4D:
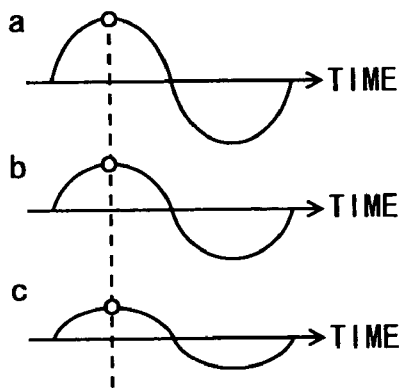

FIGS. 4C and 4D show an example of diagrams and corresponding signals of three lines. In this case, the signals of three lines are all in same phase, which suggests a high possibility that the luminance signal is input. However, it is not determined which one of |a| and |c| is closer to |b|. Thus, it is impossible to rank the vertical correlations between the signals "a" and "b" and the signals "b" and "c".

Figure 5A:
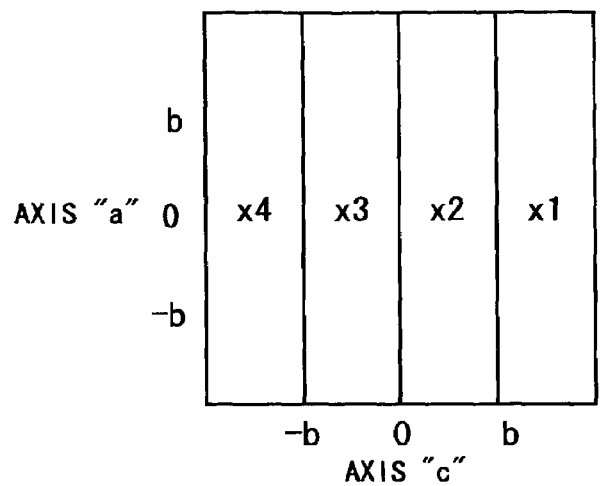
FIGS. 5A to 5E illustrate a step of classifying signals of three lines according to the present invention.
Figure 5B:
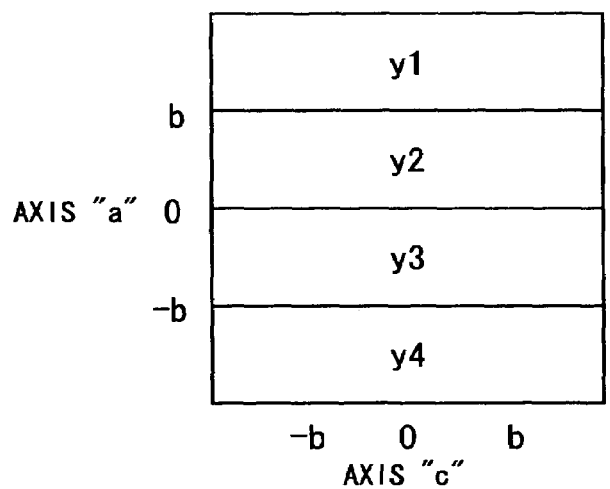
Figure 5C:
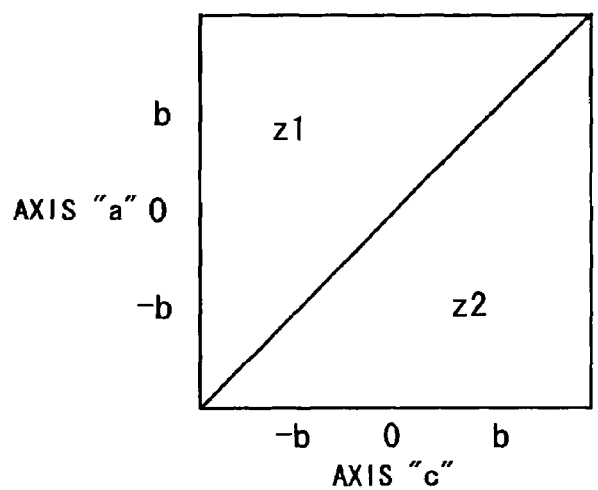
Figure 5D:
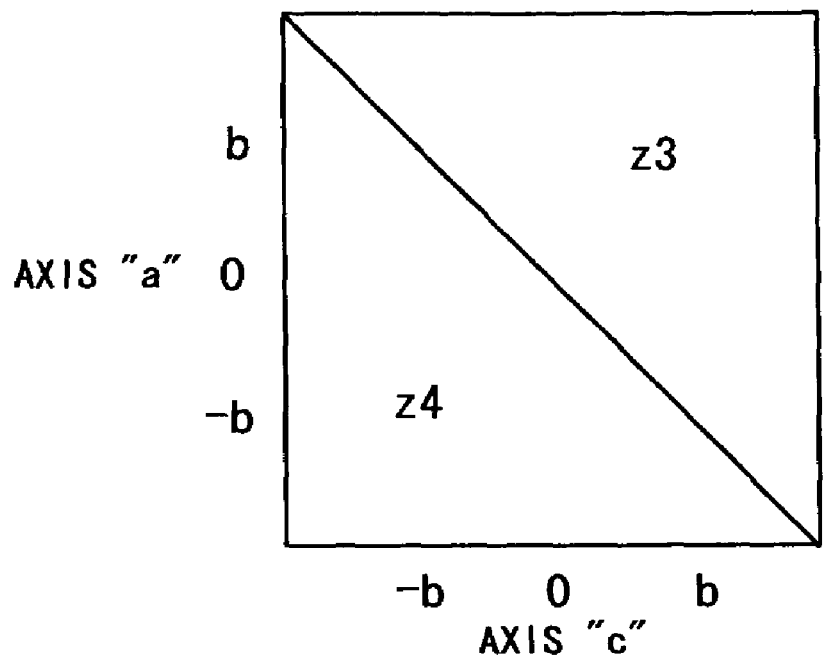
Figure 5E:
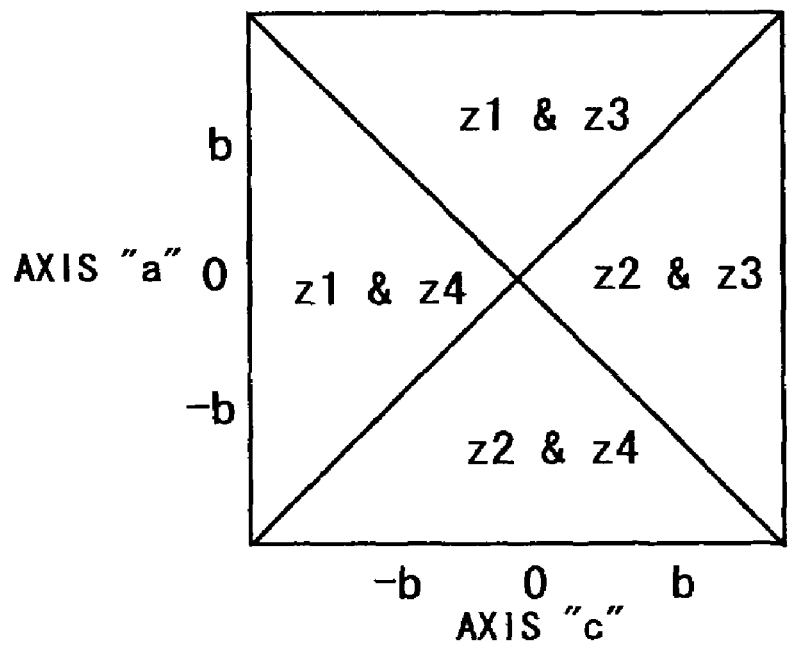

Next, a detailed description is given of a method of classifying input signals in accordance with the above classification of FIG. 2 in the pattern determination section 16. The following explanation is focused on a procedure in which classifications of FIGS. 5A, 5B, and 5E are combined to thereby attain a desired classification of 24 classes, as an example of a logic determination for attaining classifications of FIG. 2. Note that in the present invention, it is important to classify the input signals into 24 classes based on the relations in amplitude and phase between the signals "a", "b", and "c". There are several processes for dividing the classification into 24 classes. The following processes are described by way of example.

FIG. 5A shows the classification of FIG. 2, which is divided into four areas along the axis "c". In areas x1 and x2, the signals "c" and "b" are in phase. In addition, an area where $|c|>|b|$ corresponds to the area x1, while an area where $|c|<|b|$ corresponds to the area x2. Here, both the areas x1 and x2 may contain an area where $|c|=|b|$. More specifically, it is only necessary to create such an operational expression as to classify this area into either the area x1 or x2 in the logic operation for classification determination. A filter to be selected varies depending on which of the areas x1 and x2 contains this area. Although the filtering varies depending on whether this area is in the area x1 or x2, as mentioned below, if a filter characteristic at the boundary is determined such that characteristics of the output chrominance signal become consecutive, the filter characteristic never varies irrespective of whether this area is in the area x1 or x2. Further, in areas x3 and x4, the signals "c" and "b" are in opposite phase. Besides, an area where $|c|>|b|$ corresponds to the area x4, and an area where $|c|<|b|$ corresponds to the area x3.

On the other hand, FIG. 5B shows the classification of FIG. 2, which is divided into four along the axis "a". In areas y1 and y2, the signals "a" and "b" are in phase, and in areas y1 and y2, the signals "a" and "b" are in opposite phase. An area where $|a|>|b|$ corresponds to the area y1 and an area where $|a|<|b|$ corresponds to the area y2. Note that as in FIG. 5A, either the area y1 or y2 may contain an area where $|a|=|b|$. Also, in the areas y3 and y4, the signals "a" and "b" are in opposite phase. Further, an area where $|a|>|b|$ corresponds to the area y4, and an area where $|a|<|b|$ corresponds to the area y3.

Through the above classification, it is possible to classify the signals based on the amplitudes of the signals "a" and "c" relative to the signal "b" and a phase change of the signals "a" and "c" relative to the signal "b". Subsequently, the classification is made based on the relation in amplitude between the signals "a" and "c". Here, explanation is given of classifications as shown in FIGS. 5C to 5E. In an area z1 of FIG. 5C, b>0 and a>c, or b<0 and a<c, and an area z2 is other area than the area z1. As in FIG. 5A, either the area z1 or z2 may contain an area where $|a|=|c|$. In an area z3 of FIG. 5D, b>0 and c>−a, or b<0 and c<−a, and an area z4 is other area than the area z3.

In other words, the areas z1 to z4 sectionally overlap each other. To be specific, in the areas z1 and z3, $|a|>|c|$, and the signals "a" and "b" are in same phase. In the areas z2 and z4, $|a|>|c|$, and the signals "a" and "b" are in opposite phase. In the areas z2 and z3, $|a|<|c|$, and the signals "c" and "b" are in same phase. In the areas z1 and z4, $|a|<|c|$, and the signals "c" and "b" are in opposite phase. FIG. 5E shows those overlap areas.

The classification of the above areas x1 to x4, y1 to y4, and z1 to z4 as shown in FIGS. 5A to 5E can be expressed by the following logical expressions. Here, "&" represents AND operation, "~" represents NOT operation, "^" represents an exclusive OR operation (XOR), and "~^" represents an XNOR operation.

$$x1=(b<0)\char`\^(b-c<0) \quad (1)$$

$$x2=((b<0)\sim\char`\^(c<0))\&\sim((b<0)\char`\^(b-c<0)) \quad (2)$$

$$x3=((b<0)\char`\^(c<0))\&\sim((b<0)\char`\^(b+c<0)) \quad (3)$$

$$x4=(b<0)\char`\^(b+c<0) \quad (4)$$

$$y1=(b<0)\char`\^(b-a<0) \quad (5)$$

$$y2=((b<0)\sim\char`\^(a<0))\&\sim((b<0)\char`\^(b-a<0)) \quad (6)$$

$$y3=((b<0)\char`\^(a<0))\&\sim((b<0)\char`\^(b+a<0)) \quad (7)$$

$$y4=(b<0)\char`\^(b+a<0) \quad (8)$$

$$z1=(b<0)\char`\^(c-a<0) \quad (9)$$

$$z2=(b<0)\sim\char`\^(c-a<0) \quad (10)$$

$$z3=(b<0)\sim\char`\^(c+a<0) \quad (11)$$

$$z4=(b<0)\char`\^(c+a<0) \quad (12)$$

The above expressions (1) to (12) are based on the addition/subtraction performed by the addition/subtraction section 161 and the positive/negative determination performed by the code determination section 162 in such a manner that the logical operation section 163 in the Y/C separation circuit 10 can make determination. The logical operation section 163 classifies input signals through the logical operation based on the expressions (1) to (12), and outputs the filtering selection signal Sf to the filtering section 17 according to a classification result. In this way, the operation for classifying the input signals in accordance with the classification of FIG. 2 can be readily performed through a simple logical operation based on the comparison result of the code determination section 162.

Note that the method of classifying the input signals as shown in FIGS. 5A, 5B, and 5E, or based on the expressions (1) to (12) is an example of the method of classifying the input signals in accordance with the classification of FIG. 2 through the simple logical operation using the comparison result of the code determination section 162. It is possible to classify the input signals in accordance with the classification rule of FIG. 2 using 15 any other method. For example, the classification of FIG. 6 may be used in spite of those of FIGS. 5C to 5E to carry out the separation as shown in FIGS. 5A and 5B, and FIG. 6, whereby the input signals can be classified in accordance with the classification of FIG. 2.

Figure 6:
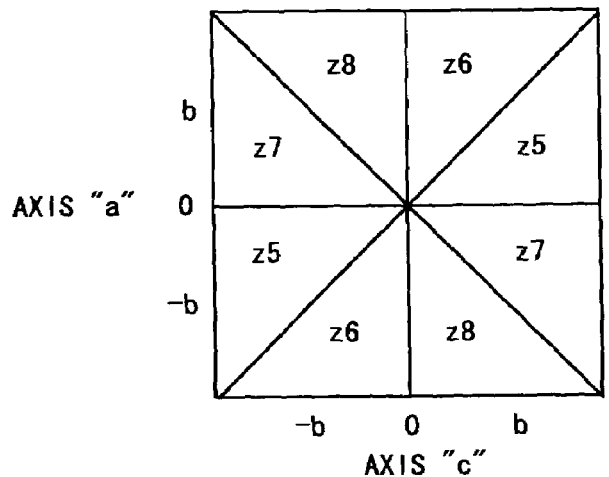
FIG. 6 illustrates a step of classifying the signals of three lines according to the present invention.

In an area z5 of FIG. 6, the signals "a" and "c" are in same phase, and $|a|<|c|$. In an area z6, the signals "a" and "c" are in same phase, and $|a|>|c|$. In an area z7, the signals "a" and "c" are in opposite phase, and $|a|<|c|$. In an area z8, the signals "a" and "c" are in opposite phase, and $|a|>|c|$. The areas z5 to z8 may be represented by the following expressions (13) to (16) as well by utilizing the comparison result of the code determination section 162.

$$z5=(a<0)\sim\char`\^(c-a<0) \quad (13)$$

$$z6=(c<0)\char`\^(c-a<0) \quad (14)$$

$$z7=(a<0)\char`\^(c+a<0) \quad (15)$$

$$z8=(c<0)\char`\^(c+a<0) \quad (16)$$

Figure 7:
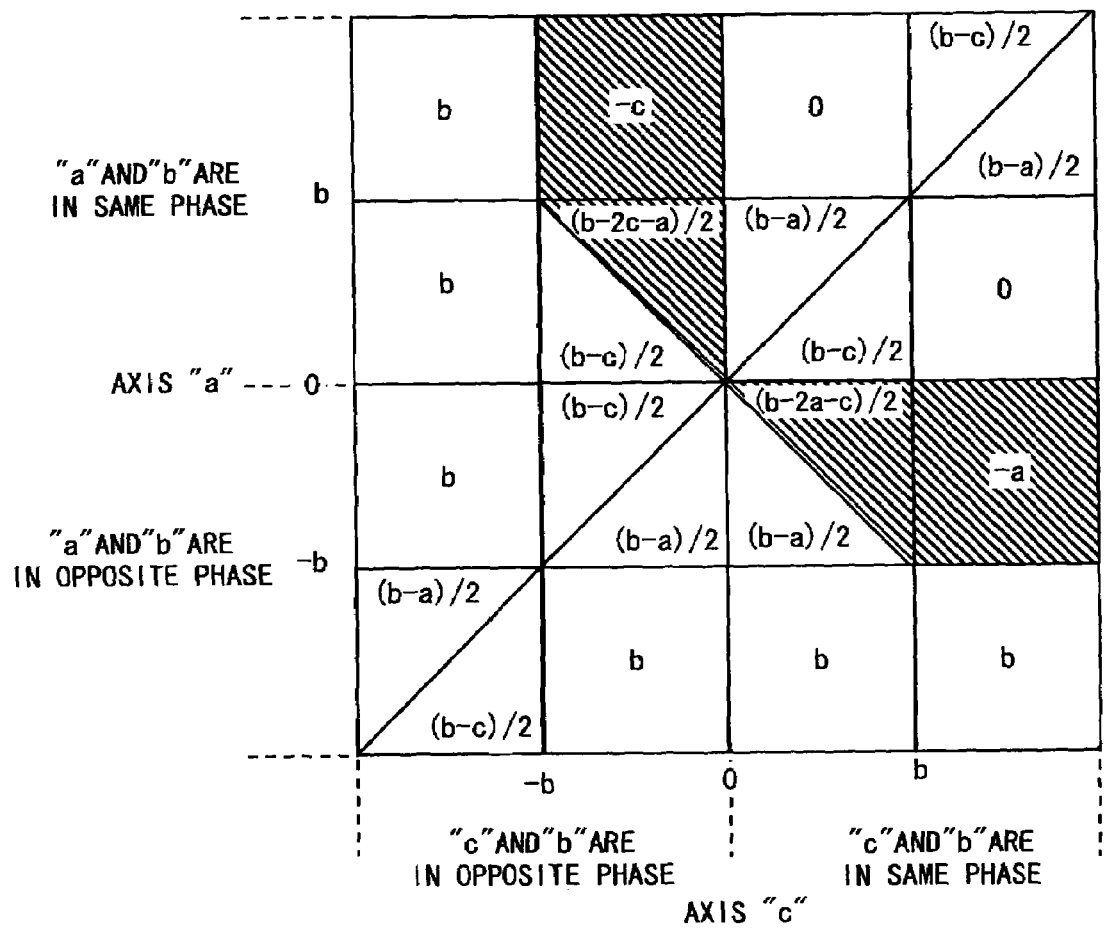
FIG. 7 shows a relation between a classification of signals of three lines and a filtering expression.

Subsequently, explanation is made about a filtering method applied to an input signal in the filtering section 17. FIG. 7 shows filtering expressions for input signals classified into each area of the classification of FIG. 2. A filtering expression is predicated on the following. First of all, when the signals "a" and "c" are in same phase with the signal "b", signals of the three lines are judged as luminance signals. When the signals "a" and "c" are both in opposite phase with the signal "b", the signals are judged as chrominance signals. Provided that the signals "a" to "c" of the three lines are judged as luminance signals or chrominance signals, among those input signals, the signals classified into areas in which vertical correlations between the signals "a" and "b" and between the signals "b" and "c" can be ranked, more specifically, areas (x1, y1), (x2, y2), (x3, y3), (x4, y4) are subjected to Y/C separation based on the two-dimensional Y/C separation method using the comb filtering to separate a chrominance signal. Herein, the comb filtering is made using either one of the signal "a" and "c" assumed to highly correlate with the reference signal "b". Note that the expression (x1, y1) stands for an area that doubles x1 as y1 in the classification method of FIGS. 5A to 5E. Other such expressions stand for the areas of FIGS. 5A to 5E.

As for the input signals in which the signals of three lines can be judged as luminance signals but the vertical correlations between the signals "a" and "b" and the signals "b" and "c" cannot be ranked, more specifically, the input signals classified into areas (x1, y2), and (x2, y1), comb filtering is not applied and no chrominance signal is output.

As for the input signals in which the signals of three lines can be judged as chrominance signals but the vertical correlation between the signals "a" and "b" and the signals "b" and "c" cannot be ranked, more specifically, the input signals classified into the areas (x3, y4), and (x4, y3), comb filtering is not applied, and the signal "b" output from the BPF 14 is used as the chrominance signal.

If either one of the signals "a" and "c" is in phase with the signal "b", and the rest is in opposite phase with the signal "b", and it cannot be determined that the signals of three lines are luminance signals or chrominance signals, it is judged that a chrominance signal is more likely to be input in consideration of an actual image. Referring to FIGS. 8A to 8D, an example of this determination is described. Out of the input signals represented by the diagram of FIG. 8A and a signal waveform of FIG. 8B, the signals "a" and "b" are in phase and the signals "a" and "c" are in opposite phase.

Figure 8A:
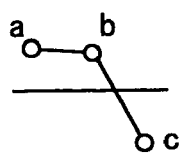
FIGS. 8A to 8D illustrate a relation between diagrams and displayed images.
Figure 8B:
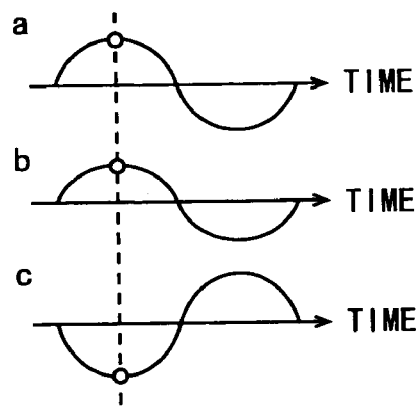
Figure 8C:
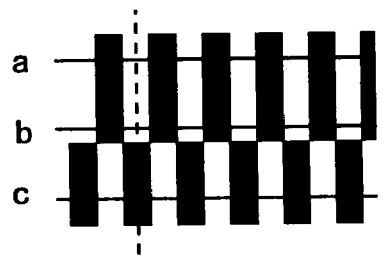
Figure 8D:
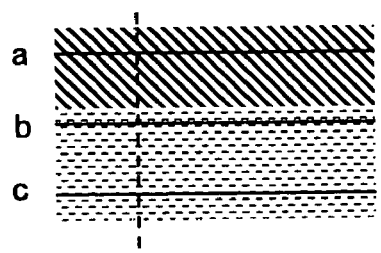

There are two images displayed according to the input signal represented by the diagram of FIG. 8A, that is, an image of a white-and-black stripe pattern shown in FIG. 8C, and an image involving a color change in the vertical direction as shown in FIG. 8D. In general, a TV screen is scanned from top to bottom, so the arrangement direction of the signals "a", "b", and "c" of FIGS. 8C and 8D is not coincident with a actual TV screen. However, for ease of explanation, the signals correspond to FIGS. 8A and 8B. The image of FIG. 8C involves a luminance transition as a result of inversion between a scanning line including the signal "b" and a scanning line including a signal "c", and has fewer color components. On the other hand, an image of FIG. 8D involves a color transition between the scanning line including the signal "b" and the scanning line including the signal "a", and has little change in luminance.

Considering an actual image, an image of FIG. 8C is scarcely obtained, and most of the images must have a color change as shown in FIG. 8D. Hence, if it is not determined whether the signals of three lines are luminance signals or chrominance signals, there is a high possibility that the chrominance signal is input, and filtering is preferentially carried out as in the case where the chrominance signal is input. More specifically, a chrominance signal is separated from input signals classified into areas (x2, y3, z2 & z4) and (x3, y2, z1 & z4) through two-dimensional Y/C separation method using comb filtering similar to the area (x3, y3). Further, as for the input signals classified into the areas (x1, y4), (x2, y4), (x4, y1), and (x4, y2), the signal "b" output from the BPF 14 is used as the chrominance signal similar to the areas (x3, y4) and (x4, y3).

Finally, a hashed area of FIG. 7 is an area where the types of signals of the three lines are hardly distinguished. According to the present invention, a filtering expression is determined such that output chrominance signals consecutively appear at a boundary between adjacent areas. Here, the adjacent areas are areas adjacent to a target area in the classifications of FIGS. 2 and 7, more specifically, areas in which one of negative/positive values of signals "a", "b", and "c" as elements of the logical expressions (1) to (12), negative/positive results of (b−a), (b−c), and (c−a), and negative/positive results of (b+a), (b+c), and (c+a) are inverted as compared with a hashed area of FIG. 7.

For example, since the output chrominance signal is set to −c without using comb filtering in the area (x3, y1), the output chrominance signal is consecutive to that of the area (x4, y1) through the boundary where c=−b, and besides, consecutive to that of the area (x2, y1) through the boundary where c=0. As for the areas (x3, y2, z1 & z3), (x2, y3, z2 & z3), and (x1, y3) as well, the output chrominance signal is determined so as to be consecutive to the adjacent area at the boundary therebetween like the area (x3, y1). To be specific, as shown in FIG. 7, the filtering expressions for each area may be set as (b−2c−a)/2, (b−2a−c)/2, and −a.

The filtering expression of FIG. 7 defines output chrominance signals in other areas such that the respective signals are consecutive to that of the adjacent area at the boundary therebetween. By setting the filtering expressions such that the output chrominance signal is consecutive to that of the adjacent area in this way, when the selected filtering operation is changed in the filtering section 17 due to a slight change in a relation in amplitude or phase between the signals of three adjacent lines, it is possible to avoid such a situation that a color or a luminance is unnecessarily changed in the displayed image due to an abrupt change in output chrominance signal.

Second Embodiment

Figure 9:
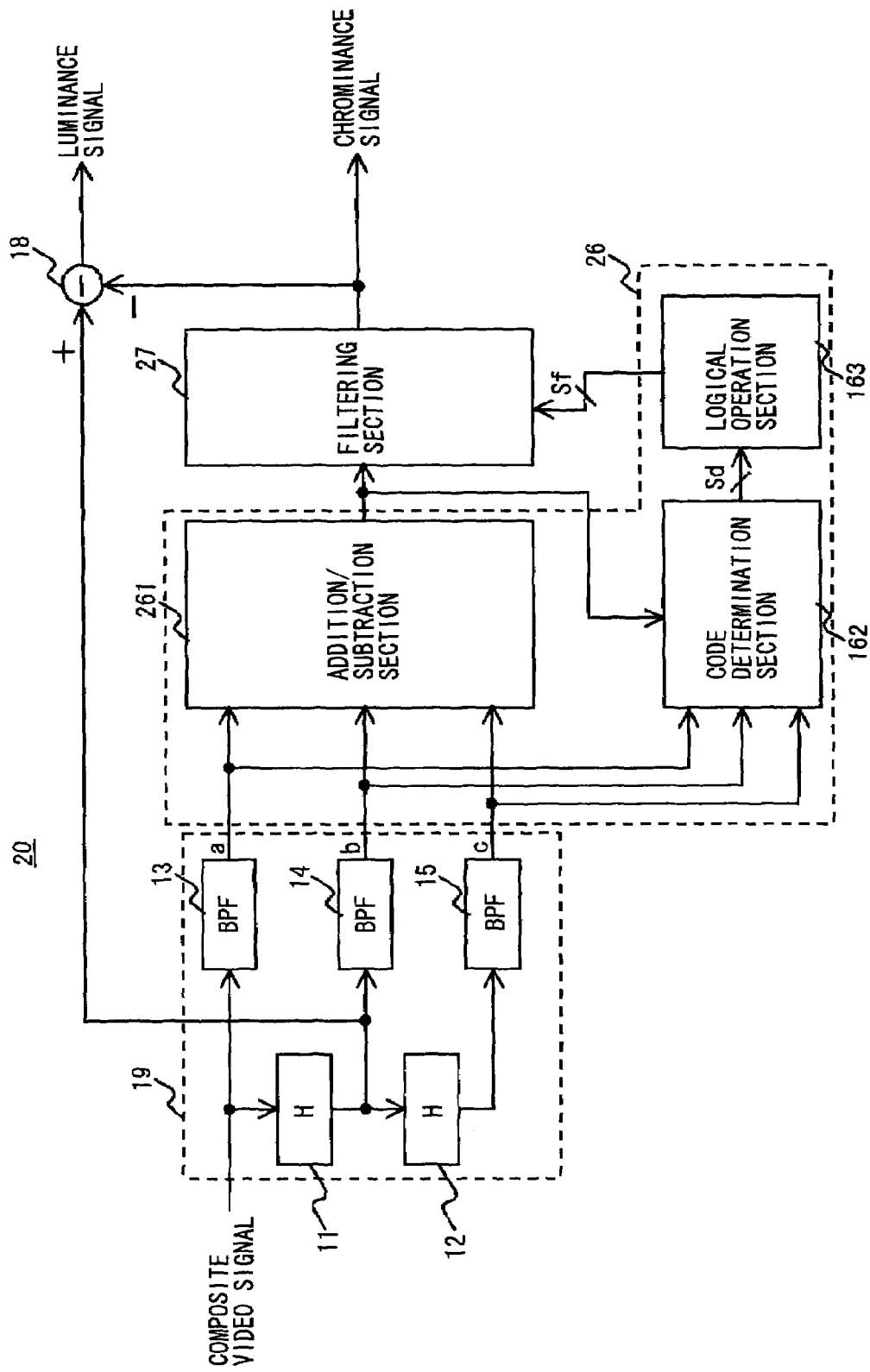
FIG. 9 is a diagram showing a Y/C separation circuit according to the present invention.

In the Y/C separation circuit 10 according to the first embodiment of the present invention, the operation carried out in the addition/subtraction section 161 is partially the same as the filtering operation carried out in the filtering section 17. Hence, the Y/C separation circuit is so configured that the same operations are carried out in the common circuit and thus is simplified. The Y/C separation circuit 20 thus configured is shown in FIG. 9. In the Y/C separation circuit 20 of FIG. 9, the delay circuits 11 and 12, the BPFs 13 to 15, and the subtracter 18 are endowed with the same functions as those of the Y/C separation circuit 10 of FIG. 1, and so given the same reference numerals, and their detailed description is omitted.

A pattern determination section 26 differs from the pattern determination section 16 in the Y/C separation circuit 10 of the first embodiment in that output signals from an addition/subtraction section 261 are fed to not only the code determination section 162 but the filtering section 27. The determination processing for classifying the input signals based on the relation in amplitude and phase between the signals of three lines, which is effected by the pattern determination section 26 is similar to the processing effected by the pattern determination section 16 in the Y/C separation circuit 10 of the first embodiment.

The filtering section 27 has a feature that the calculation result of the addition/subtraction section 261 is utilized for a part of filtering operation for separating a chrominance signal. The filtering section 27 is the same as the filtering section 17 in the Y/C separation circuit 10 of the first embodiment of the present invention in that it is determined which filtering is applied to the input signal in response to the filtering selection signal Sf supplied from the logical operation section 163.

FIG. 10 is a detailed diagram showing a configuration example of the pattern determination section 26 and the filtering section 27 in the Y/C separation circuit 20. The addition/subtraction section 261 is composed of subtracters 911, 913, and 915 and adders 912, 914, and 916, which respectively calculate values of (b−a), (b−c), (c−a), (b+a), (b+c), and (c+a), and sends calculation results to the code determination section 162. Also, the values of (b−a) and (b−c) as output signals from the subtracters 911 and 913 are commonly used for filtering for separating the chrominance signal, and thus output to the filtering section 27 as well.

The code determination section 162 is composed of comparators 921 to 929 as shown in FIG. 10. The comparators 921 to 929 determines whether the input signal takes a positive value or negative value, and outputs a logic signal as is true in the case of the negative input signal, and otherwise false, as the determination result signals Sd. This logic signal maybe a 1-bit signal that becomes 1 when being true, and 0 when being false.

The logical operation section 163 is composed of a first logic section 93 and a second logic section 94. The first logic section 93 classifies the input signals depending on a relation in amplitude and phase between signals of three lines, so the logical operation represented by the expressions (1) to (12) of the first embodiment of the present invention is carried out to output logic signals x1 to x4, y1 to y4, and z1 to z4 to the second logical operation section 94.

The second logic section 94 outputs control signals for controlling selectors 961 to 965 in the filtering section 27 according to the logic signals x1 to x4, y1 to y4, and z1 to z4 output from the logic section 93. To elaborate, the second logic section 94 carries out logical operation based on the following five logic expressions (17) to (21), and controls the selectors 961 to 965 based on the logic signals s1 to s5 as the calculation results. In short, the logic signals s1 to s5 correspond to the filtering selection signal Sf of FIG. 9. Note that the "+" in the expressions (17) to (21) stands for OR operation.

$$s1 = x4\hat{\;}y4 \quad (17)$$

$$s2 = x1\hat{\;}y1 \quad (18)$$

$$s3 = (z1\hat{\;}z3)\sim\hat{\;}(y1+y4) \quad (19)$$

$$s4 = (x4\hat{\;}y4) + z4 + ((x1+x2)\&(y1+y2)) \quad (20)$$

$$s5 = z2 \quad (21)$$

Figure 11A:
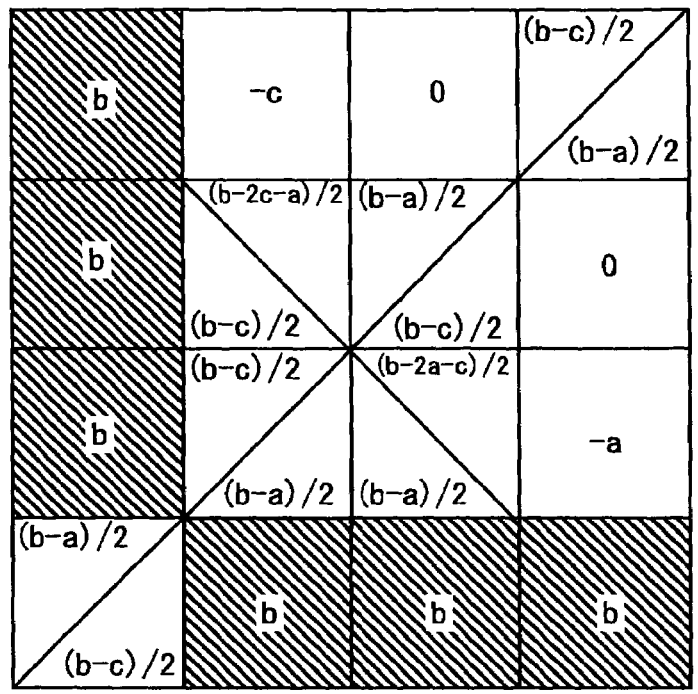
FIGS. 11A to 11C illustrate a selection range with a filtering selection signal.

The selector 961 in the filtering section 27 operates in accordance with the logic signal s1 output from the second logic section 94. The selector 961 selects a signal 2b output from a doubler 951 when the calculation result of the above logic expression (17) is true, and selects an output signal from the selector 962 at a previous stage when the calculation result of the above logic expression (17) is false. Hashed areas of FIG. 11A show an area where the calculation result of the logic expression (17) is true in the classification of FIG. 2.

Figure 11B:
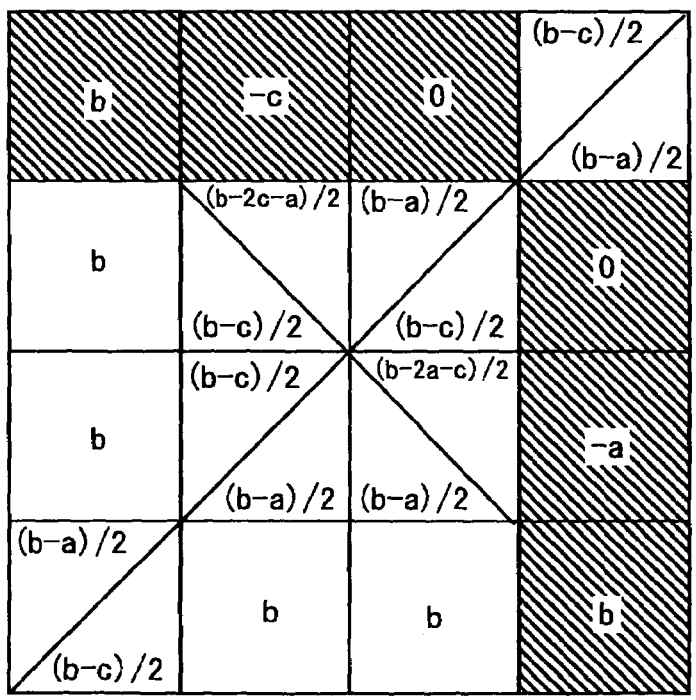

The selector 962 operates in accordance with the logic signal s2 output from the second logic section 94. The selector 962 selects 0 when the calculation result of the above logic expression (18) is true, and selects the output signal from the selector 963 at the previous stage when the calculation result of the logic expression (18) is false. Hashed areas of FIG. 11B are such that the calculation result of the logic expression (18) is true. Here, the areas (x1 ,y4) and (x4, y1) are within the area where the selector 961 selects the signal 2b, and thus need not to be used for logic determination in the selector 962. However, if those areas are used for the logic determination, the logic expression (18) is easy, so the logic determination is performed using the areas (x1, y4) and (x4, y1) as well.

Figure 11C:
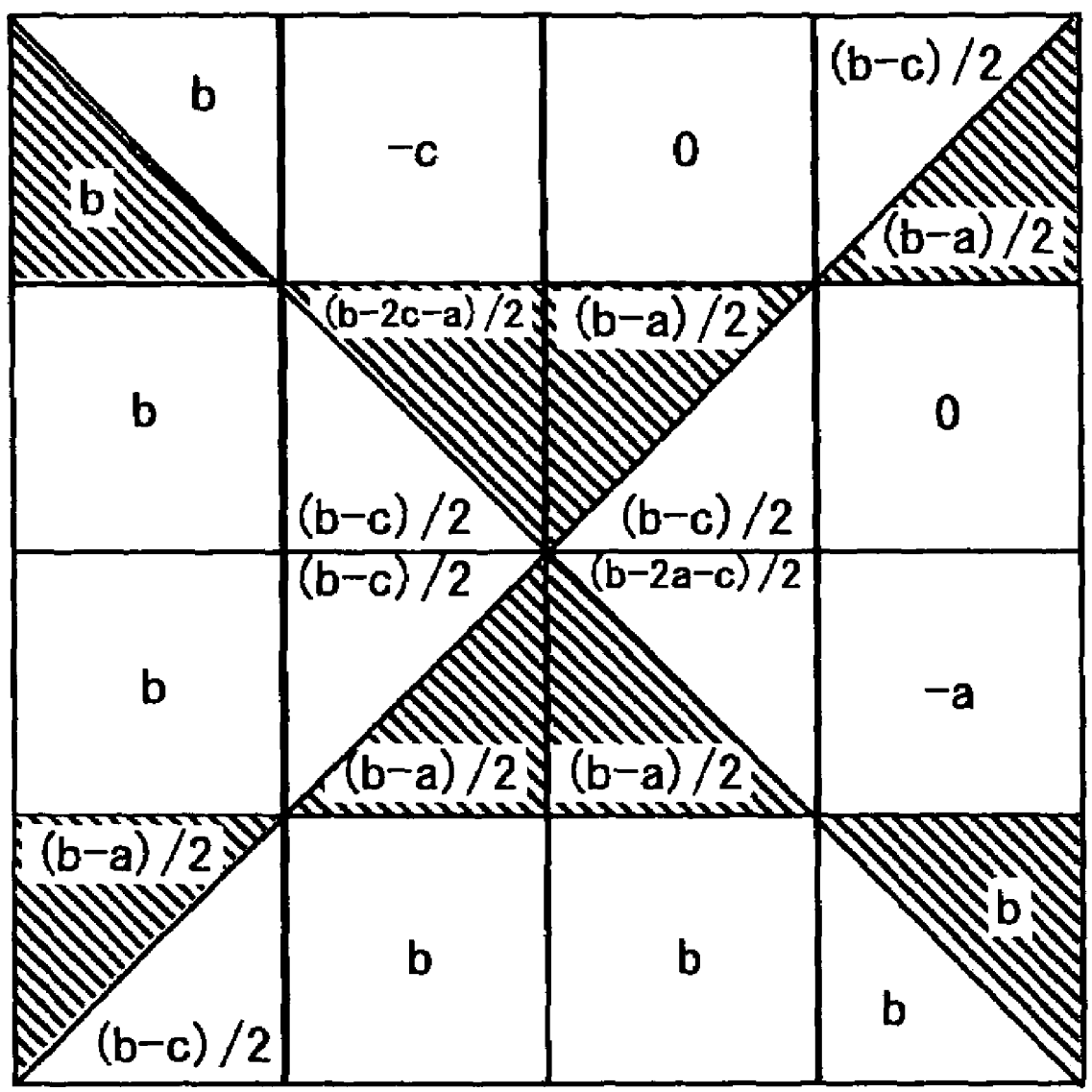

The selector 963 operates in accordance with the logic signal s3 output from the second logic section 94. The selector 963 selects a signal (b−a) output from the subtracter 911 if the calculation result of the logic expression (19) is true, and selects a signal (b−c) output from the subtracter 913 if the calculation result of the logic expression (19) is false. A hashed area of FIG. 11C indicates an area where the calculation result of the logic expression (19) is true. The remaining areas indicate areas where the calculation result of the logic expression (19) is true.

Figure 12A:
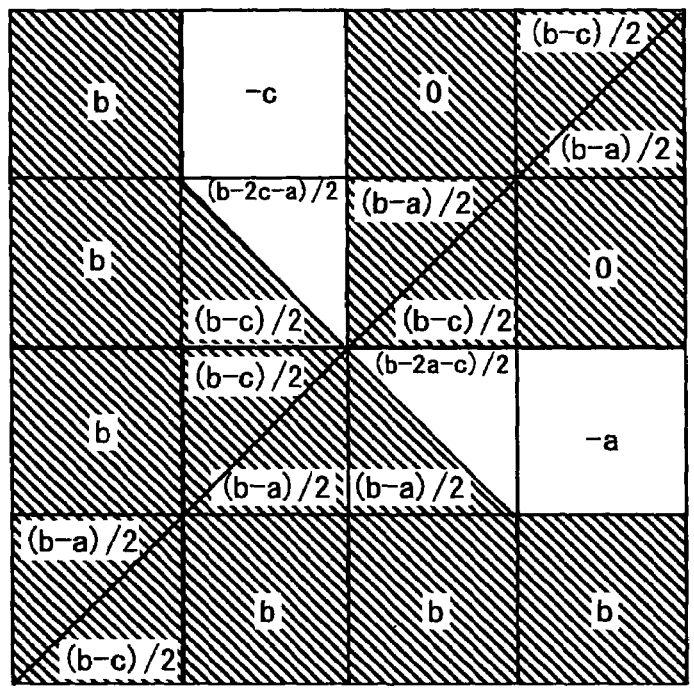
FIGS. 12A and 12B illustrate a selection range with a filtering selection signal.

The selector 964 operates in accordance with a logic signal s4 output from the second logic section 94. The selector 964 selects 0 when the calculation result of the above logic expression (20) is true, and selects the output signal from the selector 965 at the previous stage when the calculation result of the logic expression (20) is false. A hashed area of FIG. 12A is such that the calculation result of the logic expression (20) is true.

Figure 12B:
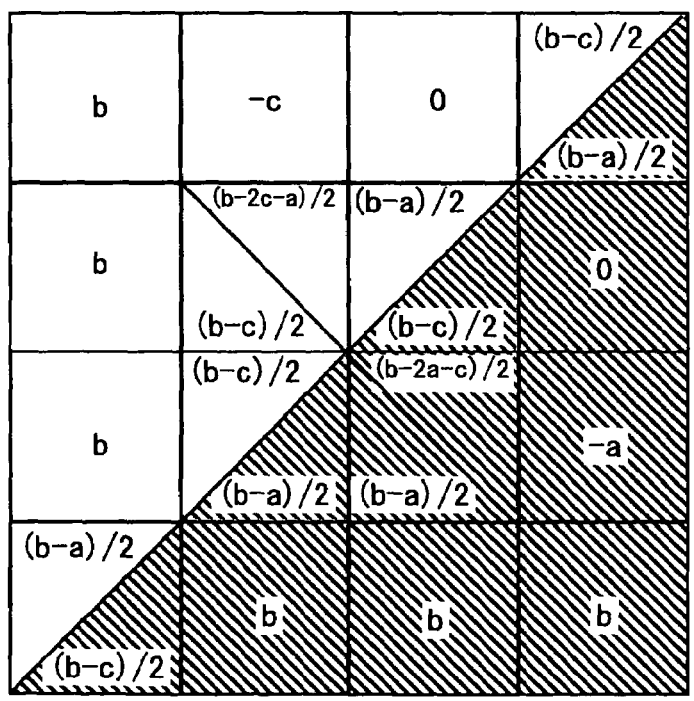

The selector 965 operates in accordance with a logic signal s5 output from the second logic section 94. The selector 965 selects the signal 2a output from the doubler 952 when the calculation result of the above logic expression (21) is true, and selects the signal 2c output from the doubler 953 when the calculation result of the logic expression (21) is false. A hashed area of FIG. 12B indicates an area where the calculation result of the logic expression (21) is true. The remaining areas indicate areas where the calculation result of the logic expression (21) is true.

The selectors 961 to 965 are controlled in accordance with the logic expressions (17) to (21) to subject signals output from the selectors 961 and 964 to subtraction in the subtracter 97 and then to halving with a half-multiplier 98, thereby filtering the input signals as shown in FIG. 7. The half-multiplier 98 outputs the separated chrominance signal. Besides, the subtracter 18 subtracts the signal output from the chrominance signal output from the half-multiplier 98 in the delay circuit 11, so the luminance signal is output.

With the Y/C separation circuit 20 according to this embodiment, in the pattern determination section 26, a relation in amplitude and phase between signals of three adjacent lines is determined through a simple logic determination using the signals "a", "b", and "c" and the addition/subtraction results thereof, and the optimum filtering operation can be selected in the filtering section 27.

Note that the selector configuration of the filtering section 27 may be variably set, and the selector selection signal for controlling the selector is not uniquely determined. Therefore, the selector configuration of the filtering section 27 and the logic expressions (17) to (21) for creating the filtering selection signals in this embodiment are give for illustrative purposes.

The Y/C separation circuit 10 and 20 in the above embodiments are applied for NTSC signal. In this case, as shown in FIGS. 1, 9 and 10, a luminance signal is obtained by subtracting a chrominance signal from a signal delayed one horizontal scanning period to the input composite video signal. If the input composite video signal is PAL signal, a luminance signal is obtained by subtracting a chrominance signal from a signal delayed two horizontal scanning periods to the input composite video signal as well as the circuit shown in FIGS. 1, 9 and 10.

It is apparent that the present invention is not limited to the above embodiment and it may be modified and changed without departing from the scope and spirit of the invention.

What is claimed is:

1. A Y/C separation circuit, comprising:
    a band selecting section outputting a first video signal, a second video signal, and a third video signal by means of extracting signals which include a chrominance subcarrier from three composite video signals that are delayed from one another by one or two horizontal scanning periods;
    a pattern determination section determining relations in amplitude and phase between the first video signal, the second video signal, and the third video signal; and
    a filtering section executing an operation for separating a chrominance signal based on the determination result of the pattern determination section to output the chrominance signal,
    wherein the pattern determination section determines the relations in amplitude and phase between the first video signal, the second video signal, and the third video signal by positive/negative determination which determines whether the first video signal, the second video signal, the third video signal, an addition signal obtained by adding two of the video signals, and a subtraction signal obtained by subtracting two of the video signals take positive values or negative values.

2. The Y/C separation circuit according to claim 1, wherein the pattern determination section includes:
    a code determination section performing the positive/negative determination to output a result of the positive/negative determination as a logic signal; and
    a logical operation section performing a logical operation on the logic signal to create a filtering selection signal, and
    the filtering section selects a filtering operation for separating the chrominance signal in response to the filtering selection signal.

3. The Y/C separation circuit according to claim 1, wherein the pattern determination section includes an addition/subtraction section executing addition/subtraction on the first video signal, the second video signal, and the third video signal necessary for the positive/negative determination, and
    the filtering section performs a filtering operation for separating a chrominance signal by use of the addition/subtraction result sent from the addition/subtraction section in the pattern determination section.

4. The Y/C separation circuit according to claim 1, wherein the pattern determination section determines the relations in amplitude and phase between the first video signal, the second video signal, and the third signal by means of, if "a" represents the first video signal, "b" represents the second video signal, and "c" represents the third video signal,
    determining the relations in amplitude and phase between "b" and "c" based on a result of determination about whether the signals "b" and "c", and calculation results of (b−c) and (b+c) take positive values or negative values,
    determining the relations in amplitude and phase between "a" and "b" based on a result of determination about whether the signals "a" and "b", and calculation results of (b−a) and (b+a) take positive values or negative values, and
    determining the relations in amplitude between |a| and |c| based on a result of determination about whether calculation results of (c−a) and (c+a) take positive values or negative values.

5. The Y/C separation circuit according to claim 1, wherein characteristics of filtering operations to separate a chrominance signal are determined so that a chrominance signal outputted from the filtering section is consecutive before and after switching of the filtering operation.

6. The Y/C separation circuit according to claim 5, wherein the switching of the filtering operation is carried out at such a timing that a positive/negative value of one of the first video signal, the second video signal, the third video signal, an addition signal obtained by adding the first video signal and the second video signal, a subtraction signal obtained by subtracting the first video signal and the second video signal from each other, an addition signal obtained by adding the second video signal and the third video signal, a subtraction signal obtained by subtracting the second video signal and the third video signal from each other, an addition signal obtained by adding the first video signal and the third video signal, and a subtraction signal obtained by subtracting the first video signal and the third video signal from each other is inverted.

7. The Y/C separation circuit according to claim 1, wherein the pattern determination section determines the relations in amplitude and phase between the first video signal, the second video signal, and the third video signal in such a manner that if the second video signal is an intermediate video signal, it is determined which pattern class the first video signal, the second video signal, and the third video signal belong to, out of 24 pattern classes obtained by combining 6 pattern classes defined based on a difference in signal amplitude between the first video signal, the second video signal, and the third video signal, with 4 pattern classes defined based on whether the first video signal and the third signal are in same phase or in opposite phase with the second video signal.

8. A Y/C separation method, comprising:
    outputting a first video signal, a second video signal, and a third video signal by means of extracting signals which include a chrominance subcarrier from three composite video signals that are delayed from one another by one or two horizontal scanning periods;
    executing positive/negative determination which determines whether the first video signal, the second video signal, the third video signal, an addition signal obtained by adding two of the video signals, and a subtraction signal obtained by subtracting two of the video signals from each other take positive values or negative values to determine relations in amplitude and phase between the first video signal, the second video signal, and the third video signal;
    selecting one of a plurality of filtering operations for separating a chrominance signal based on a result of the determination about relations in amplitude and phase between the first video signal, the second video signal, and the third video signal to output the chrominance signal through the selected filtering; and subtracting the output chrominance signal from a signal obtained by delaying the input composite video signal by one or two horizontal scanning periods to output a luminance signal.

9. The Y/C separation method according to claim 8, wherein the relations in amplitude and phase between the first video signal, the second video signal, and the third video signal are determined by determining, if the second video signal is an intermediate video signal, which pattern class the first video signal, the second video signal, and the third video signal belong to, out of 24 pattern classes obtained by combining 6 pattern classes defined based on a difference in signal amplitude between the first video signal, the second video signal, and the third video signal, with 4 pattern classes defined based on whether the first video signal and the third signal are in same phase or in opposite phase with the second video signal.

10. The Y/C separation method according to claim 8, wherein the relations in amplitude and phase between the first video signal, the second video signal, and the third signal are determined by means of, if "a" represents the first video signal, "b" represents the second video signal, and "c" represents the third video signal, determining the relations in amplitude and phase between "b" and "c" based on a result of determination about whether the signals "b" and "c", and calculation results of (b−c) and (b+c) take positive values or negative values, determining the relations in amplitude and phase between "a" and "b" based on a result of determination about whether the signals "a" and "b", and calculation results of (b−a) and (b+a) take positive values or negative values, and determining the relations in amplitude between |a| and |c| based on a result of determination about whether calculation results of (c−a) and (c+a) take positive values or negative values.

11. The Y/C separation method according to claim 8, wherein characteristics of the filtering operations are determined so that the chrominance signal is consecutive before and after switching of the filtering operation.

12. The Y/C separation method according to claim 11, wherein the switching of the filtering operation is carried out at such a timing that a positive/negative value of one of the first video signal, the second video signal, the third video signal, an addition signal obtained by adding the first video signal and the second video signal, a subtraction signal obtained by subtracting the first video signal and the second video signal from each other, an addition signal obtained by adding the second video signal and the third video signal, a subtraction signal obtained by subtracting the second video signal and the third video signal from each other, an addition signal obtained by adding the first video signal and the third video signal, and a subtraction signal obtained by subtracting the first video signal and the third video signal from each other is inverted.

13. A Y/C separation method, comprising:

outputting a video signal "a", a video signal "b", and a video signal "c" by means of extracting signals which include a chrominance subcarrier from three composite video signals that are delayed from one another by one or two horizontal scanning periods;

classifying relations in amplitude and phase between the signals "c" and "b" into one of areas divided by c=b, c=−b, and c=0;

classifying relations in amplitude and phase between the signals "a" and "b" into one of areas divided by a=b, a=−b, and a=0;

classifying a relation in amplitude between |a| and |c| and a relation in phase between the signals "a" and "c" into one of areas divided by a=c, and a=−c to determine relations in amplitude and phase between the three video signals "a", "b", and "c";

selecting one of a plurality of filtering operations for separating a chrominance signal based on a result of the determination about the relations in amplitude and phase between the three video signals "a", "b", and "c" to output the chrominance signal through the selected filtering operation; and subtracting the output chrominance signal from a signal obtained by delaying the input composite video signal by one or two horizontal scanning periods to output a luminance signal.

14. The Y/C separation method according to claim 13, wherein the relations in amplitude and phase between the three video signals "a", "b", and "c" are determined by determining whether the video signals "a", "b", and "c", an addition signal obtained by adding predetermined two of the three video signals, and a subtraction signal obtained by subtracting predetermined two of the three video signals from each other take positive values or negative values.

15. The Y/C separation method according to claim 13, wherein characteristics of the filtering operations are determined so that the chrominance signal is consecutive before and after switching of the filtering operation.

* * * * *